(12) United States Patent
Watanabe et al.

(10) Patent No.: US 8,550,202 B2
(45) Date of Patent: Oct. 8, 2013

(54) REAR PORTION STRUCTURE OF SADDLE-TYPE VEHICLE

(75) Inventors: Akimi Watanabe, Wako (JP); Yotaro Mori, Wako (JP); Naoki Kuwabara, Wako (JP); Toshitaka Akita, Wako (JP); Seiji Anzai, Wako (JP); Yusuke Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/610,510

(22) Filed: Sep. 11, 2012

(65) Prior Publication Data

US 2013/0075182 A1  Mar. 28, 2013

(30) Foreign Application Priority Data

Sep. 28, 2011 (JP) ................................. 2011-213376

(51) Int. Cl.
*B62D 61/02* (2006.01)
(52) U.S. Cl.
USPC .......................................................... 180/231
(58) Field of Classification Search
USPC .................................. 180/231, 219; 280/261
See application file for complete search history.

(56) References Cited

U.S. PATENT DOCUMENTS

| 6,499,553 B2 * | 12/2002 | Suzuki ........................... 180/251 |
| 6,866,112 B2 * | 3/2005 | Hoechst et al. ............... 180/231 |
| 7,665,561 B2 * | 2/2010 | Shiozaki et al. .............. 180/219 |
| 7,766,115 B2 * | 8/2010 | Kato et al. ..................... 180/219 |
| 7,980,347 B2 * | 7/2011 | Nagao et al. .................. 180/219 |
| 8,371,974 B2 * | 2/2013 | Morita .......................... 474/136 |

FOREIGN PATENT DOCUMENTS

JP  2009-179236 A  8/2009

* cited by examiner

*Primary Examiner* — Tashiana Adams
(74) *Attorney, Agent, or Firm* — Birch, Stewart, Kolasch & Birch, LLP

(57) ABSTRACT

To provide a rear portion structure of a saddle-type vehicle, which enables securement of a space for arranging vehicle-mounted components on the upper side of a drive chain at a position apart from a pivot shaft. A motorcycle includes a rear wheel swingably provided on a main member via a swing arm, a drive chain entrained about a driven sprocket provided on the rear wheel and a drive sprocket, and a seat frame. An air-exhaust pipe extends from an engine on a lower portion of the seat frame, an extending portion extends rearward of the vehicle from the seat frame, and a chain guide roller is mounted on the extending portion.

18 Claims, 5 Drawing Sheets

REAR PORTION STRUCTURE OF SADDLE-TYPE VEHICLE

CROSS-REFERENCE TO RELATED APPLICATIONS

This application claims priority under 35 U.S.C. §119(a) to Application No. 2011-213376, filed in Japan on Sep. 28, 2011. The entirety of the above-identified application is expressly incorporated herein by reference.

BACKGROUND OF THE INVENTION

1. Field of the Invention

The present invention relates to a rear portion structure of a saddle-type vehicle.

2. Description of Background Art

In a saddle-type vehicle, a swing arm can be swingably supported by a vehicle body frame and a rear wheel can be rotatably supported by the swing arm. A drive chain is widely used as means for transmitting a drive force of a power unit to the rear wheel in such a saddle-type vehicle. The drive chain is entrained about a drive sprocket provided on the power unit and a driven sprocket mounted on the rear wheel. Since the driven sprocket swings in the vertical direction, the drive chain also swings in association with a swinging motion of the swing arm. It is known to use a chain roller for preventing the drive chain from coming into contact with vehicle-mounted components when the vehicle-mounted components are arranged in the vicinity of the drive chain (see JP-A-2009-179236 (FIG. 3), for example).

As shown in FIG. 3 in JP-A-2009-179236, a chain roller (93) (reference numerals in parentheses indicates reference numerals in JP-A-2009-179236, hereinafter) is mounted on an inner side surface (4c) of a center frame on the upper side of a portion in the vicinity of a pivot shaft (26) via a shaft (95).

When a drive chain (19) is moved more than a predetermined extent, the drive chain (19) comes into contact with the chain roller (93), so that the drive chain (19) may be prevented from coming into contact with electrical components (91, 92) or the like.

Incidentally, the drive chain (19) does not swing in the vertical direction at portions of the drive sprocket and the driven sprocket, but is displaced (deflected) significantly in the vertical direction at an intermediate portion between the drive sprocket and the driven sprocket.

Therefore, the susceptibility of the effects of the swinging motion or the deflection of the drive chain are reduced by arranging the vehicle-mounted components considering the deflection of the drive chain in the rear portion of the vehicle. However, as a consequence, since a space for arranging the vehicle-mounted components is limited in the rear portion of the vehicle, a larger space for arrangement of the vehicle-mounted components has been desired.

SUMMARY OF THE INVENTION

Accordingly, it is an object of the present invention to provide a rear portion structure of a saddle-type vehicle, which enables securement of a space for arranging vehicle-mounted components on the upper side of a drive chain at a position apart from a pivot shaft.

According to a first aspect of the invention, a rear portion structure of a saddle-type vehicle includes a swing arm swingably supported at one end thereof by a main frame and rotatably supporting a rear wheel at the other end thereof, a drive chain entrained about a drive sprocket provided on an engine and a driven sprocket provided on the rear wheel, and a seat frame mounted on the main frame and supporting a seat, which allows an occupant to sit thereon. An air-exhaust pipe extends from the engine provided on the lower side of the seat frame, an extending portion of the seat frame extends rearward of the vehicle from the seat frame to the lower side of the air-exhaust pipe. A chain guide roller is configured to guide the drive chain and is mounted on the extending portion. The chain guide roller is arranged on an upper side of the drive chain and on a lower side of the air-exhaust pipe.

According to a second aspect of the present invention, the seat frame includes a pipe member and a forging member connected to the pipe member, and the extending portion is integrally formed with the forging member.

According to a third aspect of the present invention, the air-exhaust pipes are provided separately on the left and right sides in the vehicle width direction in plan view, and one of the left and right air-exhaust pipes of the air exhaust pipe is arranged so as to overlap with the chain guide roller.

According to a fourth aspect of the present invention, the seat frame is provided with a rear side cover configured to cover the chain guide roller from the side of the vehicle in addition to the extending portion, and an opening which allows visual inspection of the chain guide roller from the outside is provided on the rear side cover.

According to a fifth aspect of the present invention, a supporting boss configured to support the side cover is provided on the extending portion.

According to the first aspect of the present invention, the extending portion extends rearward of the vehicle from the seat frame, and the chain guide roller is mounted on the extending portion.

In the chain roller arranged in the vicinity of a pivot shaft configured to swingably support the swing arm, since the pivot shaft is affected by the amount of deflection of the drive chain or the like, a space for arranging the vehicle-mounted components to be arranged at a position apart from the pivot shaft is limited.

In this respect, according to the present invention, since the extending portion extending rearward of the vehicle is provided on the seat frame and the chain guide roller is arranged on the extending portion, not only the vehicle-mounted components to be arranged in the vicinity of the pivot shaft but also the space for arranging the vehicle-mounted components also in the vicinity of the seat frame apart from the pivot shaft may be secured.

According to the second aspect of the present invention, the seat frame includes the forging member as a component. The forging member provides high rigidity. Also, since the extending portion is integrally formed on the forging member, the number of components of the vehicle may be reduced.

According to the third aspect of the present invention, one of the left and right air-exhaust pipes is arranged on the upper side of the chain guide roller. Since the air-exhaust pipe can be arranged on the lower side, the outer diameter of the air-exhaust pipe can be increased, and a large space can be secured on the upper side of the air-exhaust pipe.

According to the fourth aspect of the present invention, the opening is provided on the rear side cover configured to cover the chain guide roller in addition to the extending portion.

The opening allows visual inspection of the state of the chain guide roller. Consequently, the maintenance property of the chain guide rollers is enhanced.

According to the fifth aspect of the present invention, the supporting boss configured to support the side cover is provided on the extending portion. The side cover can be supported without providing additionally a side cover supporting stay on the vehicle body frame. Consequently, the number of components can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
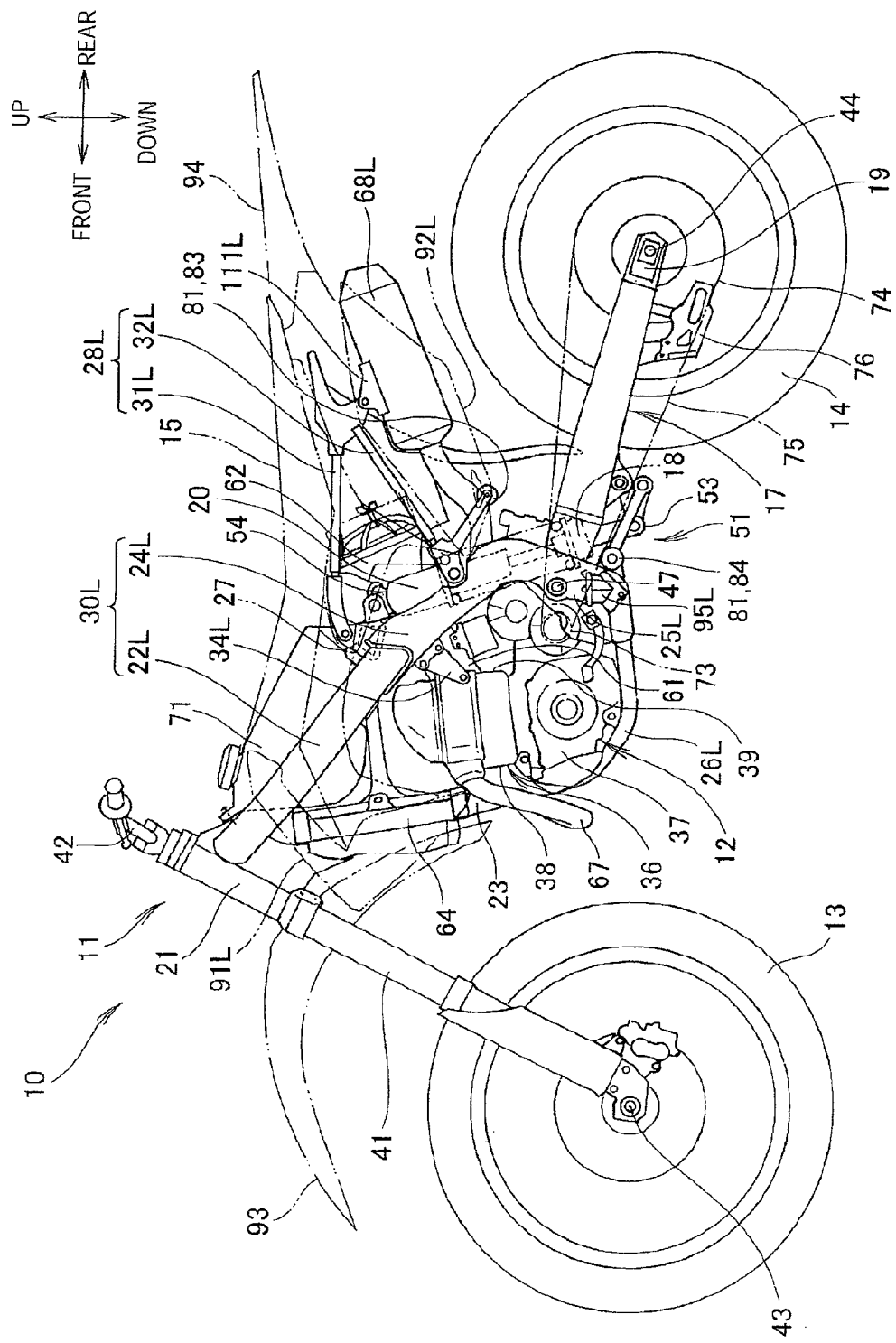
FIG. 1 is a left side view of a motorcycle according to the present invention.

The present invention will now be described with reference to the accompanying drawings, wherein the same reference numerals have been used to identify the same or similar elements throughout the several views. In the drawings and the embodiments, "up", "down", "front", "rear", "left" and "right" indicate directions viewed from a rider who is riding on a motorcycle, respectively. The drawings are to be viewed according to the orientation of the reference numerals.

As shown in FIG. 1, a motorcycle 10 is a saddle-type vehicle including an engine 12 suspended from a vehicle body frame 11, a front wheel 13 and a rear wheel 14 provided in the front and rear of the vehicle body frame 11, a seat 15 provided between the front wheel 13 and the rear wheel 14, and configured to allow an occupant to straddle and sit on the seat 15.

The vehicle body frame 11 includes a head pipe 21, left and right main members 22L, 22R (only the reference numeral 22L on the near side of the drawing is shown) extending rearward and downward of the vehicle from the head pipe 21, a down frame 23 extending rearward and downward of the vehicle from the head pipe 21 on the lower side of the main members 22L, 22R, pivot frames 24L, 24R extending downward from a rear end of a main member 22 (only the reference numeral 24L on the near side of the drawing is shown), left and right lower frames 26L, 26R (only the reference numeral 26L on the near side of the drawing is shown) extending rearward of the vehicle from a lower end portion of the down frame 23 and coupled to the pivot frames 24L, 24R, a main cross member 27 extending in the vehicle width direction at rear portions of the main members 22L, 22R, and seat frames 28L, 28R (only the reference numeral 28L on the near side of the drawing is shown) extending rearward of the vehicle from the main members 22L, 22R.

The pivot frames 24L, 24R include left and right pivot portions 25L, 25R (only the reference numeral 25L on the near side of the drawing is shown) configured to support a swing arm 17.

Members including the main members 22L, 22R and the pivot frames 24L, 24R extending from the rear ends of the main members 22L, 22R are collectively referred to as main frames 30L, 30R (only the reference numeral 30L on the near side in the drawing is shown), respectively.

The seat frames 28L, 28R include seat rails 31L, 31R (only the reference numeral 31L on the near side in the drawing is shown) configured to support the seat 15 mounted on rear portions of the main members 22L, 22R and allow the occupant to sit thereon and sub rails 32L, 32R (only the reference numeral 32L on the near side in the drawing is shown) configured to support the seat rails 31L, 31R.

The down frame 23 passes the front of the engine 12, and extends along the underside of the engine 12. The engine 12 is arranged on the back side of the down frame 23.

The engine 12 includes a crankcase 37, and a cylinder portion 36 placed on the crankcase 37 as a main body thereof. The cylinder portion 36 is supported by engine stays 34L, 34R (only the reference numeral 34L on the near side in the drawing is shown) extending from the rear portions of the main members 22L, 22R, a front lower portion of the crankcase 37 is supported by the lower frames 26L, 26R, and a rear lower portion of the crankcase 37 is supported by lower ends of the pivot frames 24L, 24R.

A front fork 41 is steerably mounted on the head pipe 21 of the vehicle body frame 11, a front wheel axle 43 extends in the vehicle width direction at a lower end of the front fork 41, and the front wheel 13 is rotatably supported by the front wheel axle 43.

A front end 18, as one end of the swing arm 17, is swingably supported by the pivot frames 24L, 24R of the vehicle body frame 11 via a pivot shaft 47, a rear wheel axle 44 is provided at a rear end 19 as the other end of the swing arm 17, and the rear wheel 14 is rotatably supported by the rear wheel axle 44.

Although the front end of the swing arm is supported by the vehicle body frame in this embodiment, as an alternative, the front end of the swing are could be supported by the engine without difficulty.

A lower end 53 of a rear cushion 52 is supported by the swing arm 17 via a link mechanism 51, and an upper end 54 of the rear cushion 52 is supported by the vehicle body frame 11. A steering handle 42 is mounted on the front fork 41.

An air-exhaust pipe 67 extends from a front surface 38 of a cylinder portion of the engine 12, a connecting tube 61 is connected to a rear surface 39 of the cylinder portion, and an air cleaner 62 is connected to the connecting tube 61 on the back side of the connecting tube 61 with respect to the vehicle. A radiator unit 64 is provided on the down frame 23.

The air-exhaust pipe 67 extends forward of the vehicle from the cylinder portion 36 of the engine 12, bypasses the front of the down frame 23 and extends to the right side of the engine 12 in the vehicle width direction, extends rearward of the vehicle from the right side of the engine 12 in the vehicle width direction, and is connected to mufflers 68L, 68R (only the reference numeral 68L on the near side in the drawing is shown) on the back side of the engine 12. The mufflers 68L, 68R are mounted on the vehicle body frame 11 on the back side of the engine 12. A fuel tank 71 is arranged on the upper side of the cylinder portion 36. The fuel tank 71 is mounted on the main members 22L, 22R.

A drive sprocket 73 configured to transmit a drive force of the engine 12 to the rear wheel 14 is provided on the lower rear portion of the crankcase 37 of the engine 12. A driven sprocket 74 is integrally provided on the rear wheel 14, and a drive chain 75 is entrained about the driven sprocket 74 and the drive sprocket 73. A chain guide 76 configured to inhibit a swing of the drive chain 75 in the vertical and lateral directions is mounted on a lower rear portion of the swing arm 17.

Separately from the chain guide 76 described above, a chain guide roller 81 configured to guide the drive chain 75 swinging together with the swinging motion of the swing arm 17 and confine the vertical swing of the drive chain 75 when the swing arm 17 pivots about the pivot shaft 47 is rotatably mounted on the vehicle body frame 11. The chain guide roller 81 includes an upper chain guide roller 83 and a lower chain guide roller 84.

Figure 4:
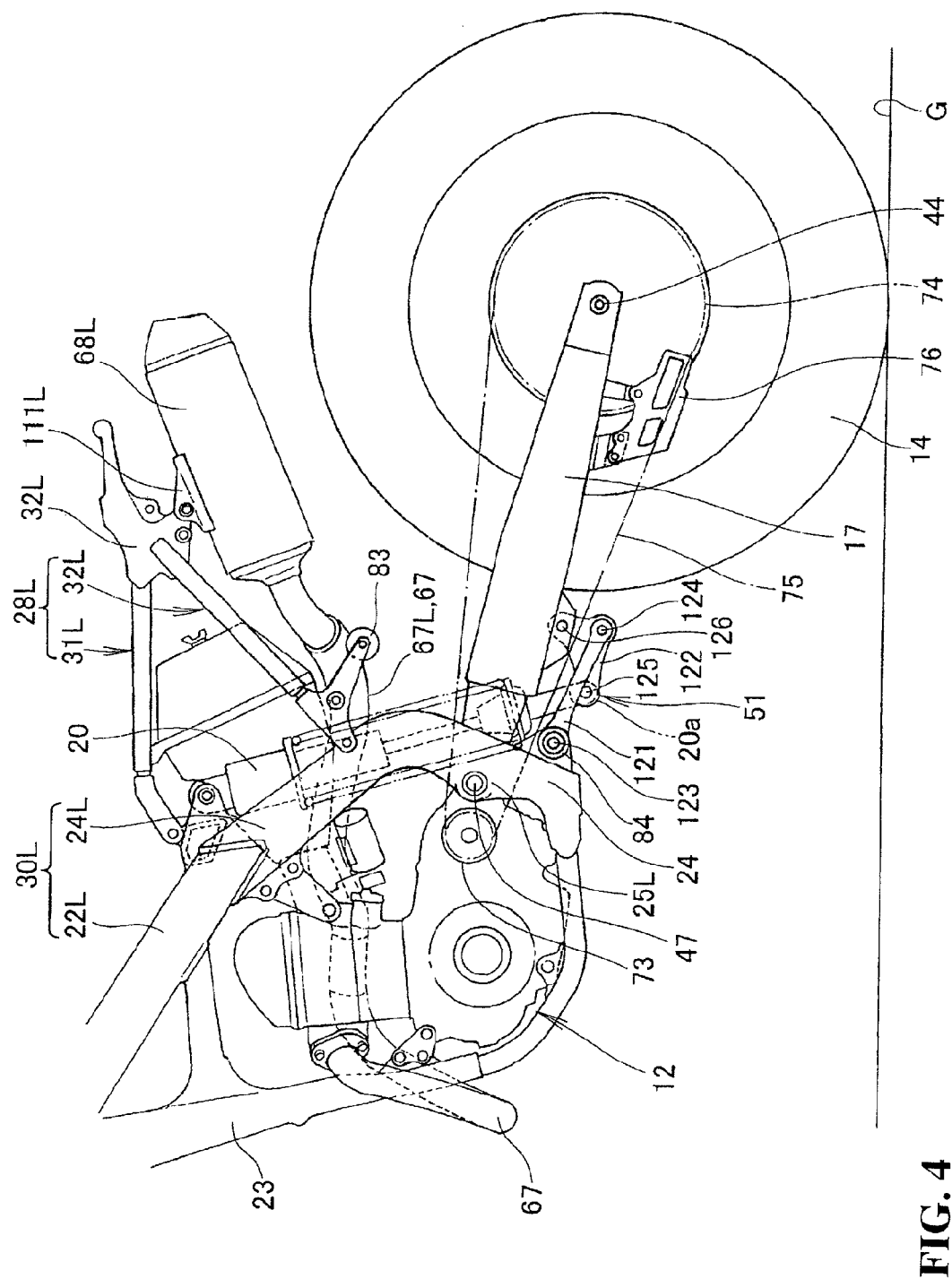
FIG. 4 is an explanatory drawing showing a configuration of the chain guide roller and an operation thereof (when a drive chain is in contact with a lower chain guide roller)

With reference to the next drawing, the upper chain guide roller 83 will be described in detail, and with reference to FIG. 4, the lower chain guide roller 84 will be described in detail.

Substantially, a vehicle body cover and the like will be described. Front side covers 91L, 91R (only the reference numeral 91L on the near side in the drawing is shown) cover an upper portion of the engine 12, the sides of the main members 22L, 22R and the sides of the fuel tank 71 and rear side covers 92L, 92R (only the reference numeral 92L on the near side in the drawing is shown) cover the sides of the air cleaner 62 so as to continue from the front side covers 91L, 91R.

A front fender 93 is mounted on the front fork 41 at a position on the upper side of the front wheel 13, and a rear fender 94 is mounted on the seat frames 28L, 28R at a position on the upper side of the rear wheel 14.

Footrests 95L, 95R (only the reference numeral 95L on the near side in the drawing is shown) where the rider places his or her feet are mounted on a lower portion of the pivot frame 24L, 24R so as to extend outward in the vehicle width direction.

Figure 2:
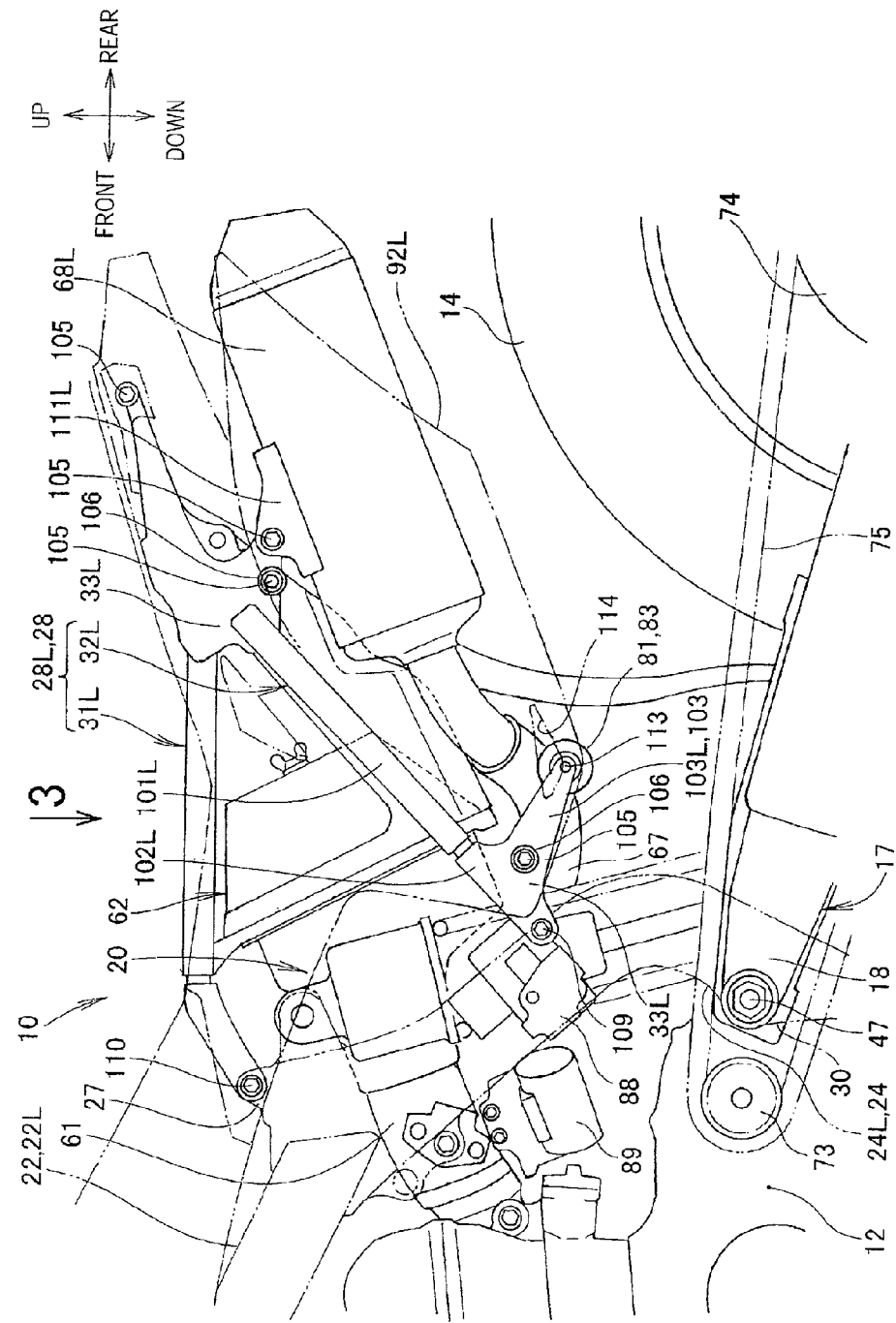
FIG. 2 is a drawing for explaining the structure of a chain guide roller and a periphery thereof.

Subsequently, the upper chain guide roller and the periphery thereof will be described. As shown in FIG. 2, the left and right seat frames 28L, 28R (only the reference numeral 28L on the near side in the drawing is shown) respectively include the left and right seat rails 31L, 31R (only the reference numeral 31L on the near side in the drawing is shown) extending rearward of the vehicle substantially horizontally from the main cross member 27 bridged between the left and right main members 22L, 22R (only the reference numeral 22L on the near side in the drawing is shown) and the left and right sub rails 32L, 32R (only the reference numeral 32L on the near side in the drawing is shown) extending obliquely rearward and upward of the vehicle from the intermediate portions in the height direction of the left and right pivot frames 24L, 24R (only the reference numeral 24L on the near side in the drawing is shown) and coupled to rear ends of the left and right seat rails 31L, 31R. Portions coupling the left and right seat rails 31L, 31R and the left and right sub rails 32L, 32R are referred, respectively, to as coupling portions 33L, 33R (only the reference numeral 33L on the near side in the drawing is shown).

The left and right sub rails 32L, 32R respectively include pipe members 101L, 101R (only the reference numeral 101L on the near side in the drawing is shown) and forging members 102L, 102R (only the reference numeral 102L on the near side in the drawing is shown) connected respectively to the pipe members 101L, 101R. Extending portions 103L, 103R (only the reference numeral 103L on the near side in the drawing is shown) are integrally formed with the forging members 102L, 102R of the left and right sub rails 32L, 32R respectively. The extending portions 103L, 103R extend rearward of the vehicle from the seat frames 28L, 28R and extend downward of the air-exhaust pipe 67. Front ends of the forging members 102L, 102R are fastened respectively to the pivot frames 24L, 24R via bolts 109, 109 (only the reference numeral 109 on the near side in the drawing is shown).

In the same manner as the left and right sub rails 32L, 32R, the left and right seat rails 31L, 31R are coupling members whose front portions are forging members and the rear portions are pipe members. Front ends of the left and right seat rails 31L, 31R are fastened to the main cross member 27 via bolts 110, 110 (only the reference numeral 110 on the near side in the drawing is shown).

The forging members 102L, 102R are provided on the seat frames 28L, 28R. The forging members 102L, 102R provide high rigidity. Also, since the extending portions 103L, 103R are integrally formed with the forging members 102L, 102R on the left side in the vehicle width direction, the number of components of the vehicle may be reduced in comparison with the case where the extending portions are extended independently and individually from the seat frames 28L, 28R.

Although the forging members are used in this embodiment, the forging members may be replaced by casting members without any difficulty.

The sides of the seat frames 28L, 28R are covered with the rear side covers 92L, 92R (only the reference numeral 92L on the near side in the drawing is shown). The rear side covers 92L, 92R are fastened to the seat rails 31L, 31R with a plurality of fastening members 105 at the extending portions 103L, 103R and the coupling portions 33L, 33R (only the reference numeral 33L on the near side in the drawing is shown) of the sub rails 32L, 32R. More specifically, a supporting boss 106 configured to support the rear side covers 92L, 92R is integrally provided with the extending portions 103L, 103R and the coupling portions 33L, 33R. By providing the supporting boss 106 integrally with the seat frames 28L, 28R, the rear side covers 92L, 92R can be supported without providing another side cover supporting stay on the vehicle body frame 11. Consequently, the number of components can be reduced.

The air-exhaust pipe 67 extending from the engine 12 to the lower side of the seat frames 28L, 28R is connected to the mufflers 68L, 68R (only the reference numeral 68L on the near side in the drawing is shown) at a rear end of the air-exhaust pipe 67. The mufflers 68L, 68R (only the reference numeral 68L on the near side in the drawing is shown) are respectively fastened to the coupling portions 33L, 33R of the sub rails 32L, 32R via muffler stays 111L, 111R (only the reference numeral 111L on the near side in the drawing is shown) and the fastening members 105, 105.

A roller shaft 113 extends inward in the vehicle width direction from the left extending portion 103L, and the chain guide roller 81 configured to guide the drive chain 75 is mounted on the roller shaft 113. The chain guide roller 81 (roller shaft 113 of upper chain guide roller 83) is arranged on the upper side of the drive chain 75 and on the lower side of the air-exhaust pipe 67.

An opening 114 configured to allow visual inspection of the chain guide roller 81 from the outside is provided on the rear side cover 92L which covers the chain guide roller 81 from both sides of the vehicle.

Although the chain guide roller is formed of a resin in this embodiment, a chain guide roller formed of rubber or metal is also applicable without any difficulty.

The rear side cover 92L configured to cover the chain guide roller 81 is formed with the opening 114. The opening 114 allows visual inspection of the state of the chain guide roller 81. Consequently, the maintenance property of the chain guide roller 81 is enhanced.

In the drawing, reference numeral 88 designates a regulator provided between a rear cushion 20 and the left pivot frame 24L, reference numeral 89 designates a capacitor provided on the front side of the regulator 88 with respect to the vehicle.

Figure 3:
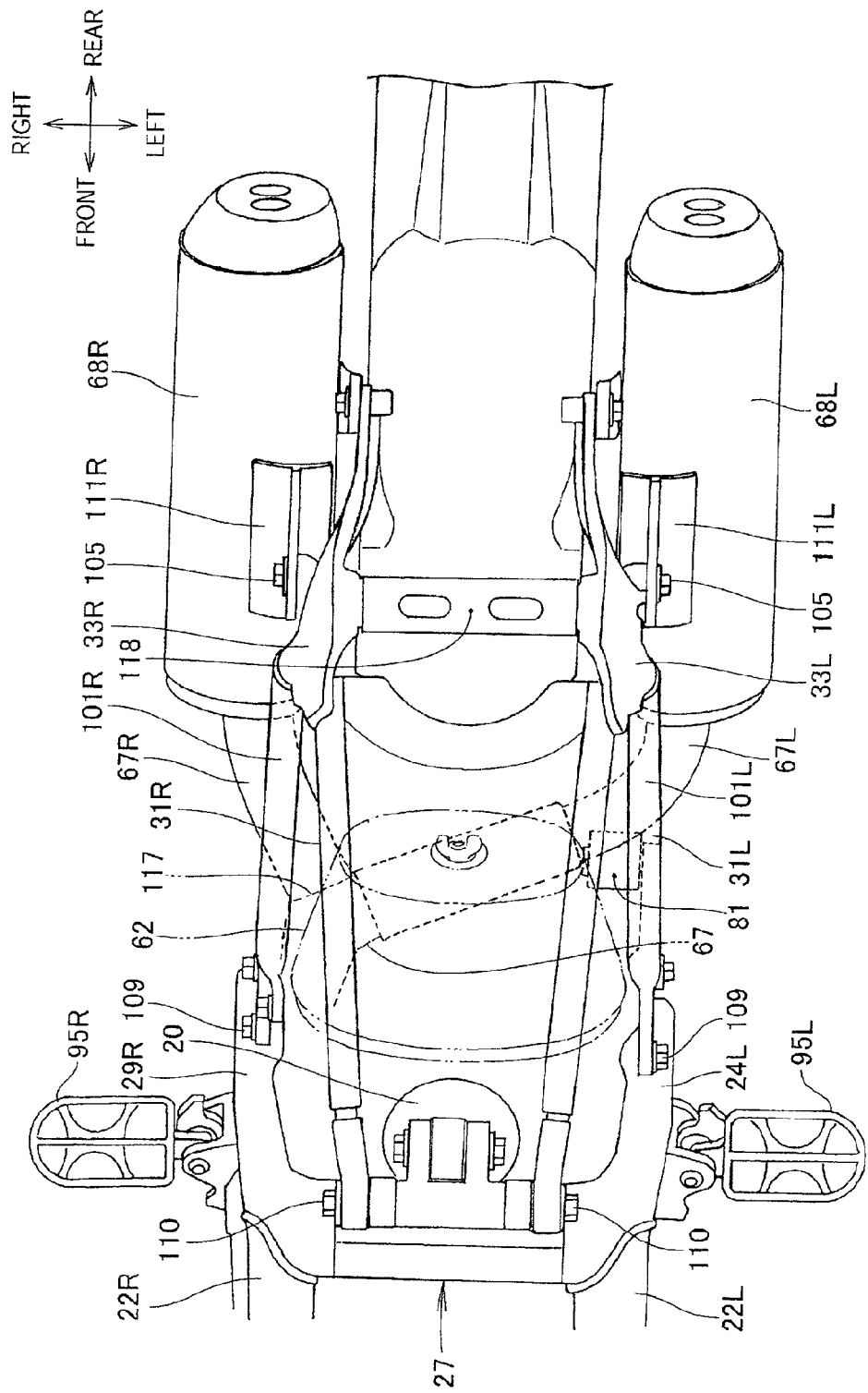
FIG. 3 is a drawing viewed in the direction indicated by an arrow 3 in FIG. 2.

Subsequently, the positional relationship or the like between the chain guide roller and the air-exhaust pipe will be described. As shown in FIG. 3, the air-exhaust pipe 67 extending rearward of the vehicle on the right side in the vehicle width direction includes a right air-exhaust pipe 67R extending rearward of the vehicle from the rear right side of the engine (reference numeral 12 in FIG. 2) and connected to the right muffler 68R and a left air-exhaust pipe 67L branched leftward in the vehicle width direction from a branch portion 117 provided on the rear right side of the engine 12 and then extending rearward of the vehicle and connected to the left muffler 68L. A rear end portion of the right air-exhaust pipe 67R is connected to the right muffler 68R, and a rear end portion of the left air-exhaust pipe 67L is connected to the left muffler 68L. Reference numeral 118 designates a cross member.

In other words, the air-exhaust pipe 67 is branched to the left and right at the branch portion provided on the rear portion of the vehicle and provided separately on the left and right sides in the vehicle width direction. The air-exhaust pipe 67L on one (left) of the left and right sides of the air-exhaust pipe 67 is arranged so as to overlap with the chain guide roller 81 in plan view.

By arranging the air-exhaust pipe 67L at the position overlapped with the chain guide roller 81, the air-exhaust pipe 67L can be arranged at a low position. In other words, a space for arranging not only the vehicle-mounted components arranged in the vicinity of the pivot shaft (reference numeral 47 in FIG. 2), but also the vehicle-mounted components in the vicinity of the seat frame (reference numeral 28 in FIG. 2) apart from the pivot shaft 47 can be secured.

The chain guide roller 81 is supported on the inside in the vehicle width direction of the extending portion 103L extending rearward of the vehicle from the seat frame 28L in a cantilevered manner.

When the extending portion 103L is provided on the inside in the vehicle width direction, a predetermined gap with respect to the rear wheel cannot be secured easily, and the width of the chain guide roller 81 becomes smaller.

In this aspect, according to the present invention, the supporting structure of the chain guide roller 81 is configured to be the cantilevered supporting structure from the outside in the vehicle width direction, the chain guide roller 81 wider in the width direction is provided.

Subsequently, the lower chain guide roller and the like provided in the link mechanism will be described. As shown in FIG. 4, the link mechanism 51 includes a first arm member 121 extending from a lower rear end of the pivot frame 24, a second arm member 122 having a substantially triangular shape in side view of the vehicle provided at a distal end of the first arm member 121, a first link pin 123 provided between the pivot frame 24 and the first arm member 121, a second link pin 124 provided between the first arm member 121 and the second arm member 122, a third link pin 125 provided between the second arm member 122 and a rod extremity 20a of the rear cushion 20, and a fourth link pin 126 provided between the second arm member 122 and the swing arm 17. The first to fourth link pins 123 to 126 extend respectively in the vehicle width direction. The lower chain guide roller 84 is rotatably mounted on the first link pin 123. The lower chain guide roller 84 guides the drive chain 75, which passes on the upper side thereof, and confines the downward swinging motion of the drive chain 75.

An operation of the rear portion structure of the saddle-type vehicle described above will be described below.

In the drawing, when the rear wheel 14 comes into contact with a ground G, and when a large load is not applied in the direction of the vehicle height, the swing arm 17 is balanced in the position in which the rear end is inclined downward from the substantially horizontal position. At this time, the rear cushion 20 is in the substantially expanded state. The drive chain 75 is in contact with the lower chain guide roller 84.

Figure 5:
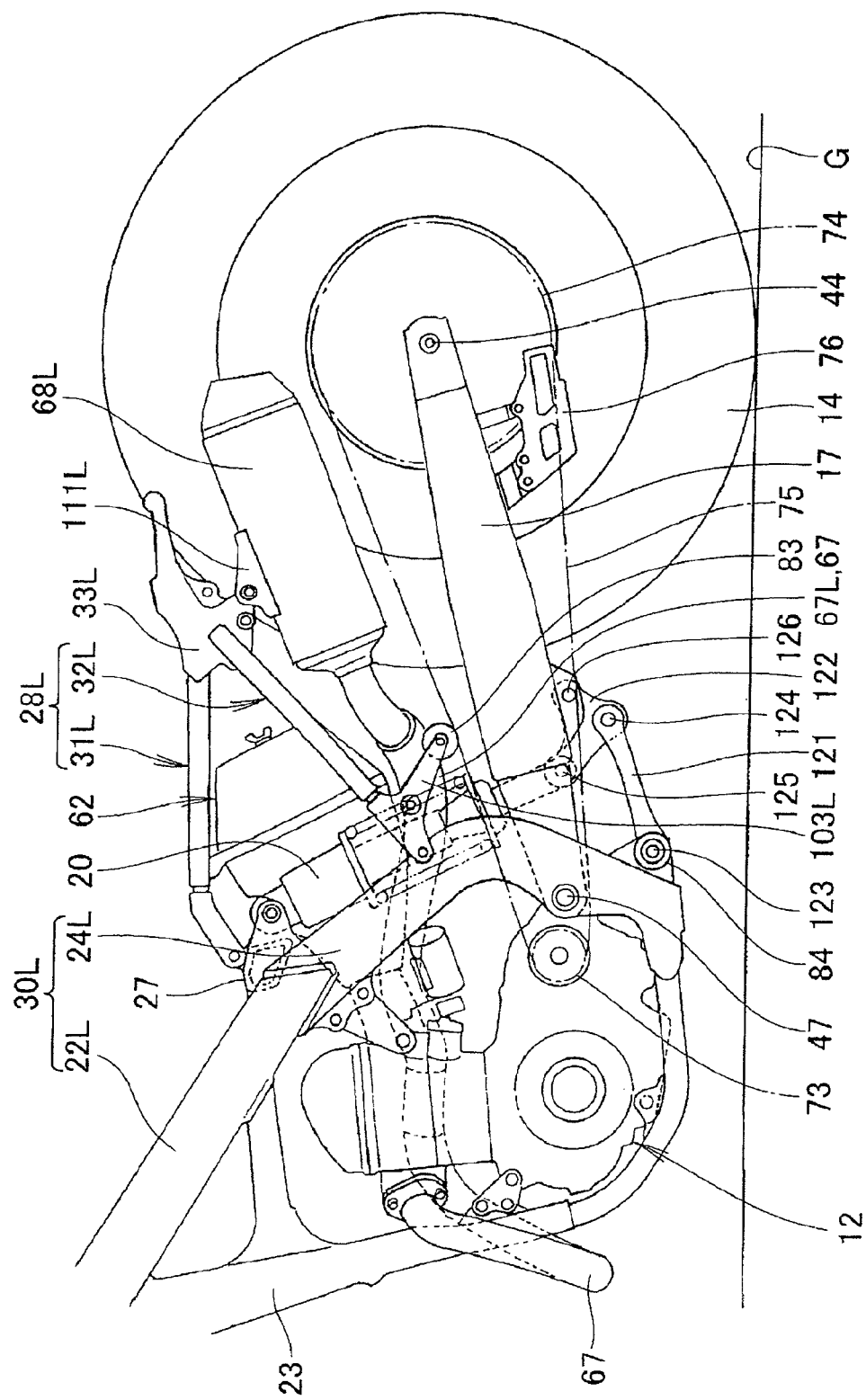
FIG. 5 is an explanatory drawing showing an operation of the chain guide roller (when the drive chain is in contact with an upper chain guide roller).

As shown in FIG. 5, when the rear wheel 14 comes into contact with the ground G, and a large load is applied from the rear wheel 14 in the direction of the vehicle height, the swing arm 17 takes a position in which the rear end is inclined upward from the substantially horizontal position. At this time, the rear cushion 20 is in the contracted state. The drive chain 75 is in contact with the upper chain guide roller 83.

The upper chain guide roller 83 is mounted to the extending portion 103L extending rearward of the vehicle from the forging member 102L of the seat frames 28L, 28R.

If the upper chain guide roller 83 is arranged in the vicinity of the pivot shaft 47, the pivot shaft 47 is affected by the amount of deflection and the like of the drive chain 75. Consequently, the space where the vehicle-mounted components are arranged is limited.

In this aspect, according to the present invention, the extending portion 103L extending rearward of the vehicle is provided on the seat frame 28L arranged on the upper side of the pivot shaft 47, and the upper chain guide roller 83 is arranged on the extending portion 103L.

Since the upper chain guide roller 83 is disposed apart from the pivot shaft 47, not only the vehicle-mounted components to be arranged in the vicinity of the pivot shaft 47, but also the vehicle-mounted components such as the air-exhaust pipe 67L or the muffler 68L and the like may be arranged also in the vicinity of the seat frame 28L apart from the pivot shaft 47.

In the present invention, a casting member or a member formed by a mechanical process may be employed as the member which constitutes the seat frame without any difficulty.

In the present invention, an air-exhaust pipe overlapped with the chain guide roller in plan view may be a single line instead of being branched to the right and left separately without any difficulty.

In the present invention, a notched portion may be employed an opening for viewing the chain guide roller opened on the rear side cover without any difficulty.

Although the present invention is applied to a motorcycle in the embodiment, it is applicable to a saddle-type three-wheeled vehicle or a general saddle-type vehicle without problem. The present invention is suitable for the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear portion structure of a saddle-type vehicle, comprising:
   a swing arm swingably supported at one end thereof by a main frame and rotatably supporting a rear wheel at the other end thereof;
   a drive chain entrained about a drive sprocket provided on an engine and a driven sprocket provided on the rear wheel;
   a seat frame mounted on the main frame and supporting a seat, the seat allowing an occupant to sit thereon;
   an air-exhaust pipe extending from the engine and provided on a lower side of the seat frame;
   an extending portion of the seat frame, said extending portion extending rearward of the vehicle from the seat frame to the lower side of the air-exhaust pipe; and
   a chain guide roller configured to guide the drive chain, said chain guide roller being mounted on the extending portion,
   wherein the chain guide roller is arranged on an upper side of the drive chain and on a lower side of the air-exhaust pipe.

2. The rear portion structure of a saddle-type vehicle according to claim 1, wherein the seat frame includes a pipe member and a forging member connected to the pipe member, and the extending portion is integrally formed with the forging member.

3. The rear portion structure of a saddle-type vehicle according to claim 1, wherein there are left and right of said air-exhaust pipe provided separately on the left and right sides in the vehicle width direction in plan view, and one of the left and right air-exhaust pipes is arranged so as to overlap with the chain guide roller.

4. The rear portion structure of a saddle-type vehicle according to claim 2, wherein there are left and right of said air-exhaust pipe provided separately on the left and right sides in the vehicle width direction in plan view, and one of the left and right air-exhaust pipes is arranged so as to overlap with the chain guide roller.

5. The rear portion structure of a saddle-type vehicle according to claim 1, wherein the seat frame is provided with a rear side cover configured to cover the chain guide roller from the side of the vehicle in addition to the extending portion, and an opening that allows visual inspection of the chain guide roller from the outside is provided on the rear side cover.

6. The rear portion structure of a saddle-type vehicle according to claim 2, wherein the seat frame is provided with a rear side cover configured to cover the chain guide roller from the side of the vehicle in addition to the extending portion, and an opening that allows visual inspection of the chain guide roller from the outside is provided on the rear side cover.

7. The rear portion structure of a saddle-type vehicle according to claim 5, wherein a supporting boss configured to support the rear side cover is provided on the extending portion.

8. The rear portion structure of a saddle-type vehicle according to claim 6, wherein a supporting boss configured to support the rear side cover is provided on the extending portion.

9. The rear portion structure of a saddle-type vehicle according to claim 1, wherein the chain guide roller is supported for rotation on a roller shaft that extends inward in the vehicle width direction from the extending portion, and the roller shaft overlaps with the air-exhaust pipe in plan view and passes below the air-exhaust pipe.

10. A rear portion structure of a vehicle, comprising:
    a drive chain configured to be entrained about a drive sprocket provided on one of a main frame and an engine of the vehicle and a driven sprocket provided on the rear wheel;
    a seat frame mounted on the main frame and configured to support a seat;
    an air-exhaust pipe extending from the engine and provided on a lower side of the seat frame;
    an extending portion of the seat frame, said extending portion extending rearward of the vehicle from the seat frame to the lower side of the air-exhaust pipe; and
    a chain guide roller configured to guide the drive chain, said chain guide roller being mounted on the extending portion,
    wherein the chain guide roller is arranged on an upper side of the drive chain and on a lower side of the air-exhaust pipe.

11. The rear portion structure of a saddle-type vehicle according to claim 10, wherein the seat frame includes a pipe member and a forging member connected to the pipe member, and the extending portion is integrally formed with the forging member.

12. The rear portion structure of a saddle-type vehicle according to claim 10, wherein there are left and right of said air-exhaust pipe provided separately on the left and right sides in the vehicle width direction in plan view, and one of the left and right air-exhaust pipes is arranged so as to overlap with the chain guide roller.

13. The rear portion structure of a saddle-type vehicle according to claim 11, wherein there are left and right of said air-exhaust pipe provided separately on the left and right sides in the vehicle width direction in plan view, and one of the left and right air-exhaust pipes is arranged so as to overlap with the chain guide roller.

14. The rear portion structure of a saddle-type vehicle according to claim 10, wherein the seat frame is provided with a rear side cover configured to cover the chain guide roller from the side of the vehicle in addition to the extending portion, and an opening that allows visual inspection of the chain guide roller from the outside is provided on the rear side cover.

15. The rear portion structure of a saddle-type vehicle according to claim 11, wherein the seat frame is provided with a rear side cover configured to cover the chain guide roller from the side of the vehicle in addition to the extending portion, and an opening that allows visual inspection of the chain guide roller from the outside is provided on the rear side cover.

16. The rear portion structure of a saddle-type vehicle according to claim 14, wherein a supporting boss configured to support the rear side cover is provided on the extending portion.

17. The rear portion structure of a saddle-type vehicle according to claim 15, wherein a supporting boss configured to support the rear side cover is provided on the extending portion.

18. The rear portion structure of a saddle-type vehicle according to claim 10, wherein the chain guide roller is supported for rotation on a roller shaft that extends inward in the vehicle width direction from the extending portion, and the roller shaft overlaps with the air-exhaust pipe in plan view and passes below the air-exhaust pipe.

* * * * *